July 17, 1951         K. H. RECKER        2,560,820
METHOD FOR WAX-COATING BEANS AND CARROTS
Filed Aug. 26, 1948                          2 Sheets-Sheet 2
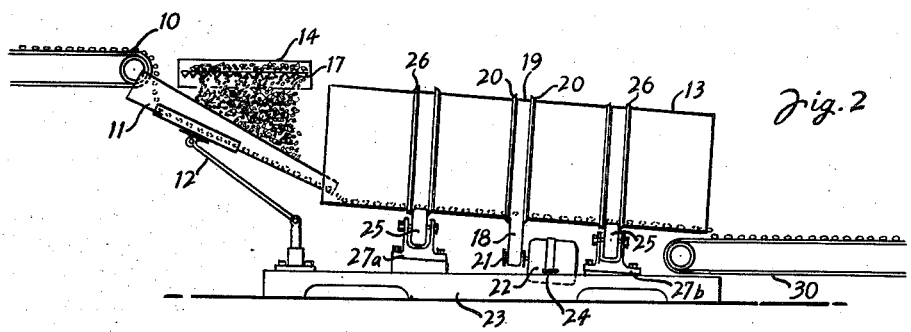
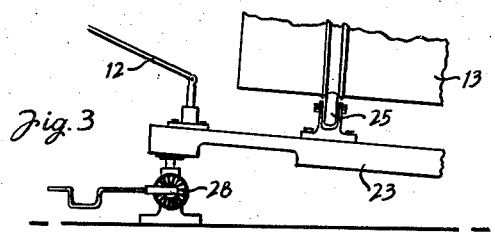
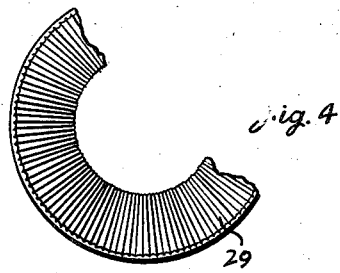
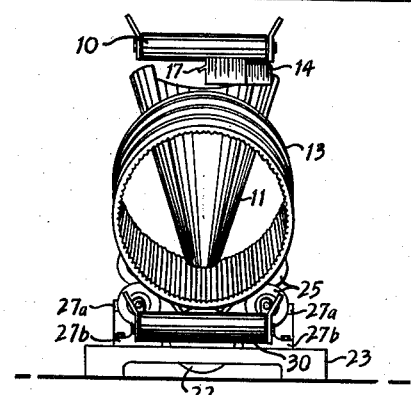
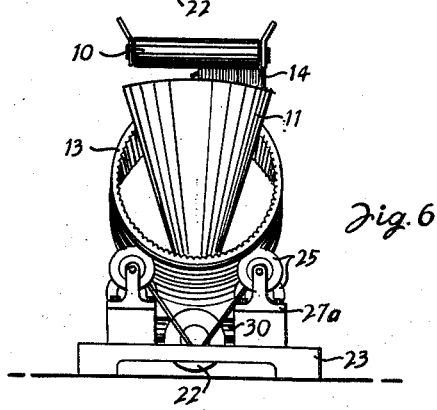
*INVENTOR*
Kenneth H. Recker
BY
*ATTORNEY*

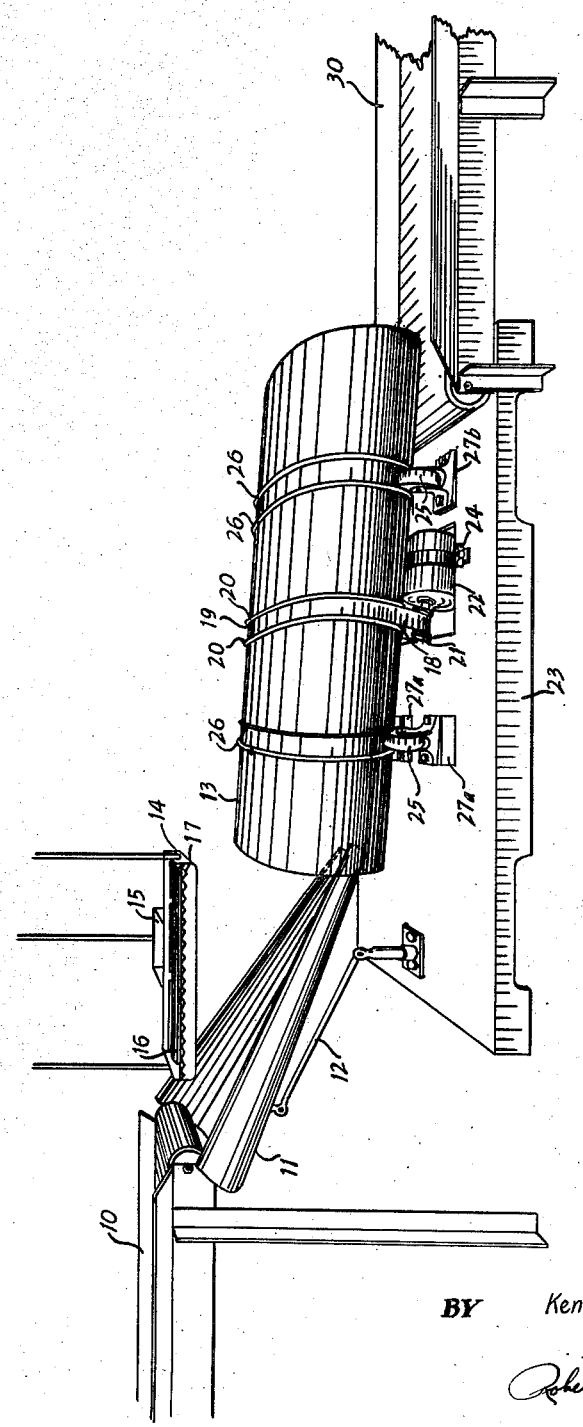

Patented July 17, 1951

2,560,820

UNITED STATES PATENT OFFICE 2,560,820

METHOD FOR WAX COATING BEANS AND CARROTS

Kenneth H. Recker, Winter Haven, Fla.

Application August 26, 1948, Serial No. 46,246

3 Claims. (Cl. 99—168)

This invention relates to a waxing apparatus by means of which produce may be waxed. More particularly, the invention relates to a waxing apparatus especially adapted for providing a protective wax coating for beans, carrots and the like.

The use of wax as a means of affording a protective film to fruits and vegetables is commercially acknowledged today. The benefits rendered the produce by such a film are proven and numerous. Such benefits include retarding shrinkage and providing improved appearance.

While various systems of application have been proposed, three major systems are in use today. These systems are (1) applying wax in the form of a solid slab by means of brushes and subsequently buffing the fruit or vegetables to produce an improved appearance; (2) applying the wax with a volatile hydrocarbon as the carrier and subsequently buffing the fruit or vegetables; (3) applying self-polishing wax in the form of an aqueous wax suspension or emulsion.

The common methods of applying wax in the form of an aqueous wax suspension or emulsion such as dipping, spraying and drenching have definite limitations and disadvantages. These limitations include the bulky equipment required, the spread of excessive wax and the hazard of disease-spreading or infectious agents being present in the aqueous bath where the produce is continually immersed therein. When employing these methods, excessive moisture drying actually occurs after the produce is placed in containers to be shipped, causing spots of wax to appear on the surface which are unsightly and reflect on the price obtained for the same.

Although the beneficial results, which can be obtained by the coating of beans, carrots and the like, are known, in applicant's knowledge no commercially feasible method or apparatus has been proposed for applying the wax to such produce.

I have therefore developed a new and novel method of coating beans, carrots or the like comprising introducing a plurality of beans, carrots or the like into a treating zone, applying an aqueous wax emulsion in the form of foam to the produce, distributing the foam on the surface of said produce by the intimate contact of the individual articles of produce with each other as they progress through the treating zone. It is appreciated that various apparatus may be employed to facilitate this method, however, I have developed and found particularly satisfactory an apparatus as hereinafter described.

It is therefore the primary object of this invention to provide a method of coating beans, carrots and the like wherein a wax emulsion with a low moisture content is applied to said produce by foaming the emulsion on said produce and distributing it thereupon, and in conjunction therewith, an apparatus which will economically and thoroughly distribute said foam to small-size produce, such as beans, providing said beans with a protective wax film.

Another object of the invention is to provide an apparatus which will thoroughly and uniformly wax-coat small-size produce, such as beans, carrots and the like, by reason of the intimate contact of the individual articles of produce with each other.

Another object of the invention is to provide an apparatus capable of waxing small-size produce, such as beans, carrots and the like, in a continuous process.

A further object of the invention is to provide a waxing apparatus of the type described which may be manufactured and subsequently installed at a minimum cost.

Additional objects, advantages and features of the invention will be apparent from the following description considered in connection with the accompanying drawing wherein:

Figure 1 is a side elevational view of the bean waxing apparatus.

Figure 2 is a schematic view of the bean waxing apparatus showing said apparatus in operation.

Figure 3 is a side elevational view of a supplemental means by which the cylindrical drum may be positioned off the horizontal plane.

Figure 4 is a sectional view of the inner periphery of the cylindrical drum.

Figure 5 is a plan view of the bean waxing apparatus showing the apparatus as viewed from the discharge end.

Figure 6 is a plan view of the bean waxing apparatus as viewed from the feed end.

Similar numerals refer to similar parts throughout the several views.

Referring especially to Figures 1 and 2 it will be seen that 10 is a conveyor, shown as demonstrative of typical means by which the beans or the like may be delivered to the apparatus. Upon reaching the end of said conveyor 10, the beans drop into a chute 11. This chute 11 may be supported by a brace 12 or other suitable means. As the beans, for example, reacting to the force of gravity, descend in said chute 11 into the cylindrical drum 13, they are contacted by an aqueous wax emulsion foam, emitted by the wax foamer 14 positioned above said chute 11. However, it should be appreciated that said foamer 14 may be affixed in other positions, e. g., so that the foam is emitted upon the produce within the drum 13, rather than within the chute 11. Said wax foamer 14, as seen in Figure 1, is comprised of a surge or supply tank 15 containing a charge of wax emulsion. This surge tank 15 supplies a mechanical agitating means 16 which agitates and foams the emulsion, whereupon the foam flows over serrated lip 17 and falls upon the beans moving in said chute 11 below. Said chute 11 deposits the foam-contacted beans in drum 13, whereupon said beans are coated with a thin protective wax film. The wax foam is thoroughly distributed by the continual physical contact of the individual beans with one another. This contact is made possible within the drum 13 by said drum's rotating action. Drum 13 is rotated by means of a belt 18 which rides in a track 19 formed by ribbons 20. Said belt 18 is motivated by a drive shaft 21 protruding from a conventional motor 22 which is affixed securely to the chassis or base 23 by means of wing nuts 24. Cylindrical drum 13 is supported by means of a plurality of rollers 25, said drum being guided by means of two tracks formed by ribbons 26 in which rollers 25 ride. The oblique or off the horizontal plane position of the drum is caused by the varying dimensions of the roller supports 27a and 27b. Roller supports 27a, nearest the feed end of said drum 13, are slightly greater in height than the supports 27b, causing the discharge end of said drum 13 to rest at a lower level than the feed end of said drum 13. If desired, the oblique position of the drum 13 may be attained by varying the height of the rollers 25.

Another embodiment of a means by which the rotary drum may be positioned off the horizontal plane is presented in Figure 3. A manually operated jack 28 may be built into the feed end of the chassis 23, said jack 28 allowing various angles of adjustment of the apparatus along the horizontal plane. Although illustrated in Figure 3 as being manually operated, it should be understood that said jack 28 may be manually or hydraulically adjusted.

Because of centrifugal force as the drum 13 rotates, the beans somewhat adhere to the drum's inner periphery, making a half-turn with the drum 13, then falling and inter-mixing with the other beans. The oblique position of said drum 13 and a plurality of louvers 29 lining the inner periphery of the drum in conjunction with the rotating action, cause the beans to gradually reach the discharge end where they are discharged upon a conveyor 30 or other suitable transporting means.

Any angle of obliquity desired may be employed when positioning the rotary drum 13, however, I have found that an angle of 15° to 25° off the horizontal plane is most desirable for commercial use when waxing beans.

If desired, the drum 13 may be positioned on a perfectly horizontal plane. This, however, would necessitate the positioning of helical grooves (not shown) for example, upon the inner periphery of said drum 13 in order to progress the produce through the cylindrical drum.

Depending upon the size of the drum 13, and the volume of the bean charge to be waxed, the R. P. M. may be correspondingly varied.

Whereas the wax foamer 14 has been shown as entirely mechanical, it should be realized that if desired, the wax emulsion may be foamed through aeration contact therewith.

Many apparently different embodiments of this invention may be made without departing from the principle, breadth and spirit thereof, and it is to be understood, therefore, that this invention is not limited to the specific embodiments thereof except as encompassed by the following claims.

I claim:

1. A method of coating beans and carrots comprising introducing said produce into a treating zone, applying an aqueous wax emulsion in the form of foam to said produce, rotating said produce to distribute said foam on the surface thereof by the intimate contact of the individual articles of produce with each other as said produce progresses through the treating zone.

2. A method of coating beans and carrots comprising introducing said produce into a rotating treating zone, applying an aqueous wax emulsion in the form of foam to said produce, distributing said foam on the surface of said produce by the intimate contact of the individual articles of produce with each other as said produce progresses through the rotating treating zone.

3. A method of coating beans and carrots comprising applying an aqueous wax emulsion in the form of foam to said produce, introducing said produce into a rotating treating zone, distributing said foam on the surface of said produce by the intimate contact of the individual articles of produce with each other as said produce progresses through the rotating treating zone.

KENNETH H. RECKER.

REFERENCES CITED

The following references are of record in the file of this patent:

UNITED STATES PATENTS

| Number | Name | Date |
|---|---|---|
| 312,041 | Upjohn | Feb. 10, 1885 |
| 678,399 | Hays | July 16, 1901 |
| 1,476,840 | Ranney | Dec. 11, 1923 |
| 2,128,028 | Hampton | Aug. 23, 1938 |
| 2,217,815 | Rector | Oct. 15, 1940 |
| 2,290,452 | Sharma | July 21, 1942 |
| 2,464,529 | Recker | Mar. 15, 1949 |
| 2,469,914 | Bridgeman | May 10, 1949 |
| 2,472,775 | Newhall | June 7, 1949 |